Sept. 5, 1944.   C. Z. MONROE   2,357,535
CONTAINER FABRICATING MACHINE
Filed June 13, 1940    11 Sheets-Sheet 1
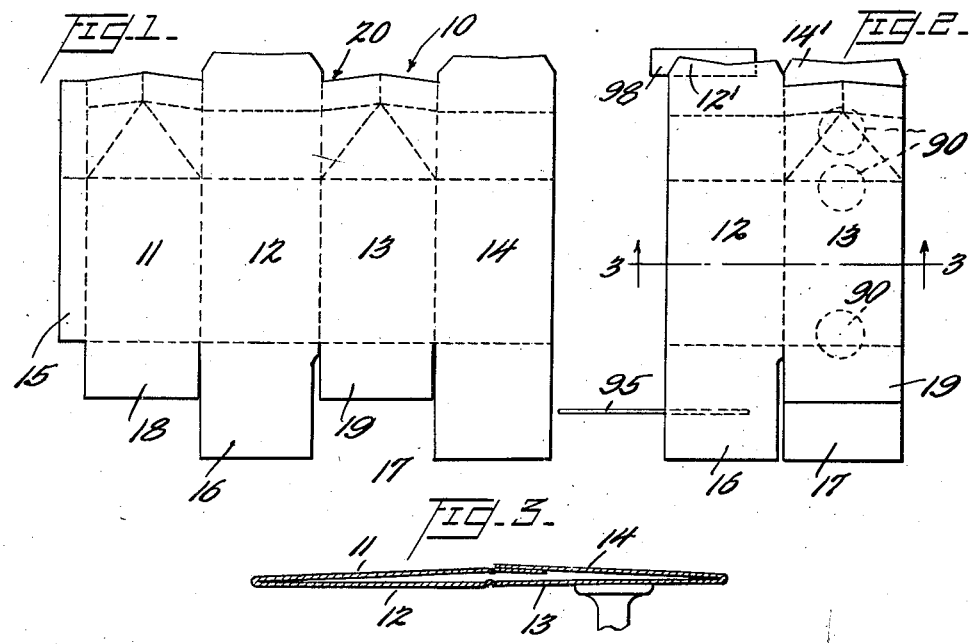
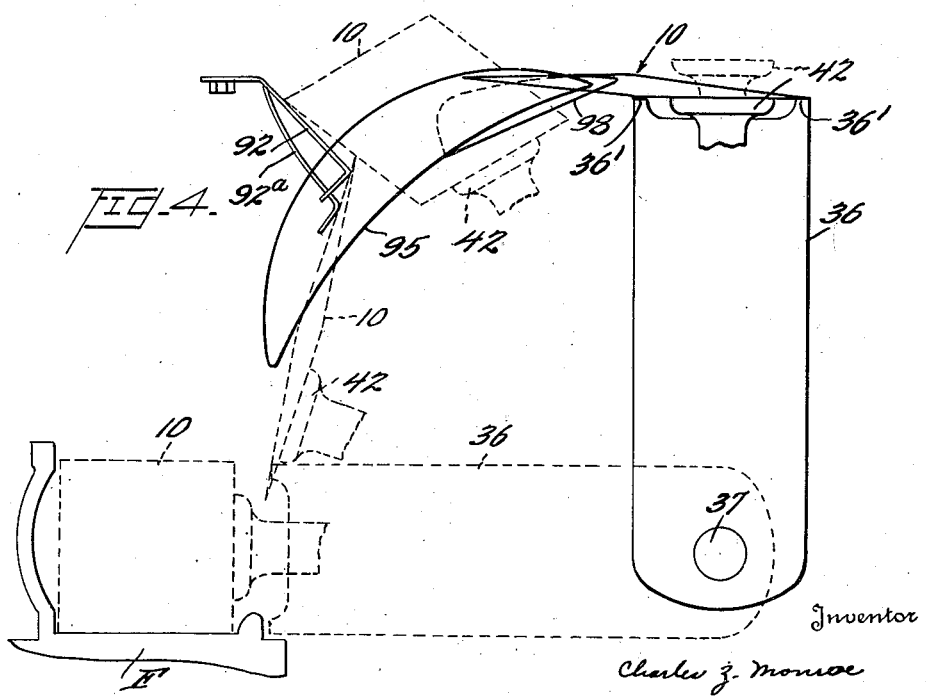
Inventor
Charles Z. Monroe
By Watson, Cole, Grindle & Watson
Attorney Sept. 5, 1944.  C. Z. MONROE  2,357,535
CONTAINER FABRICATING MACHINE
Filed June 13, 1940  11 Sheets-Sheet 2
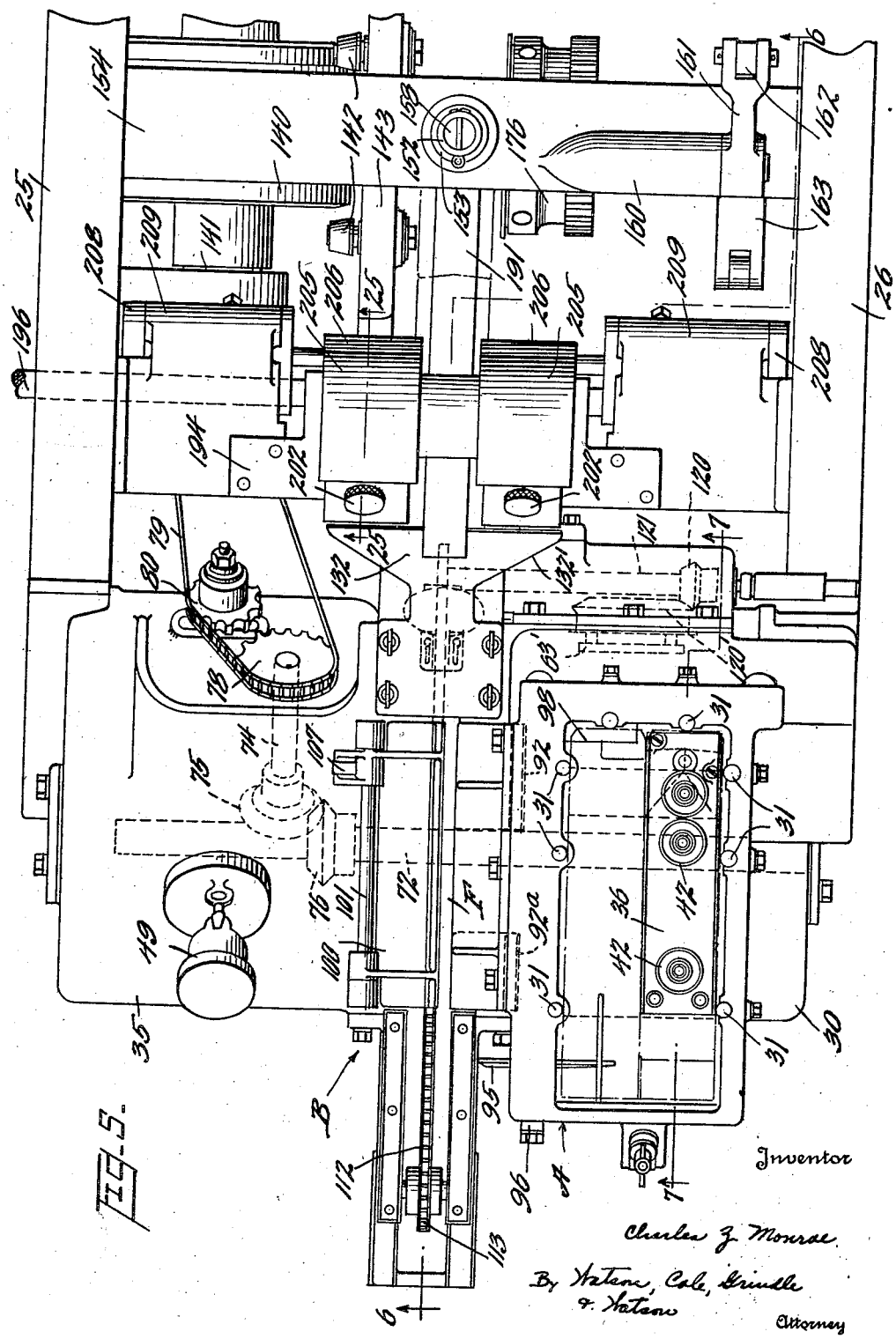

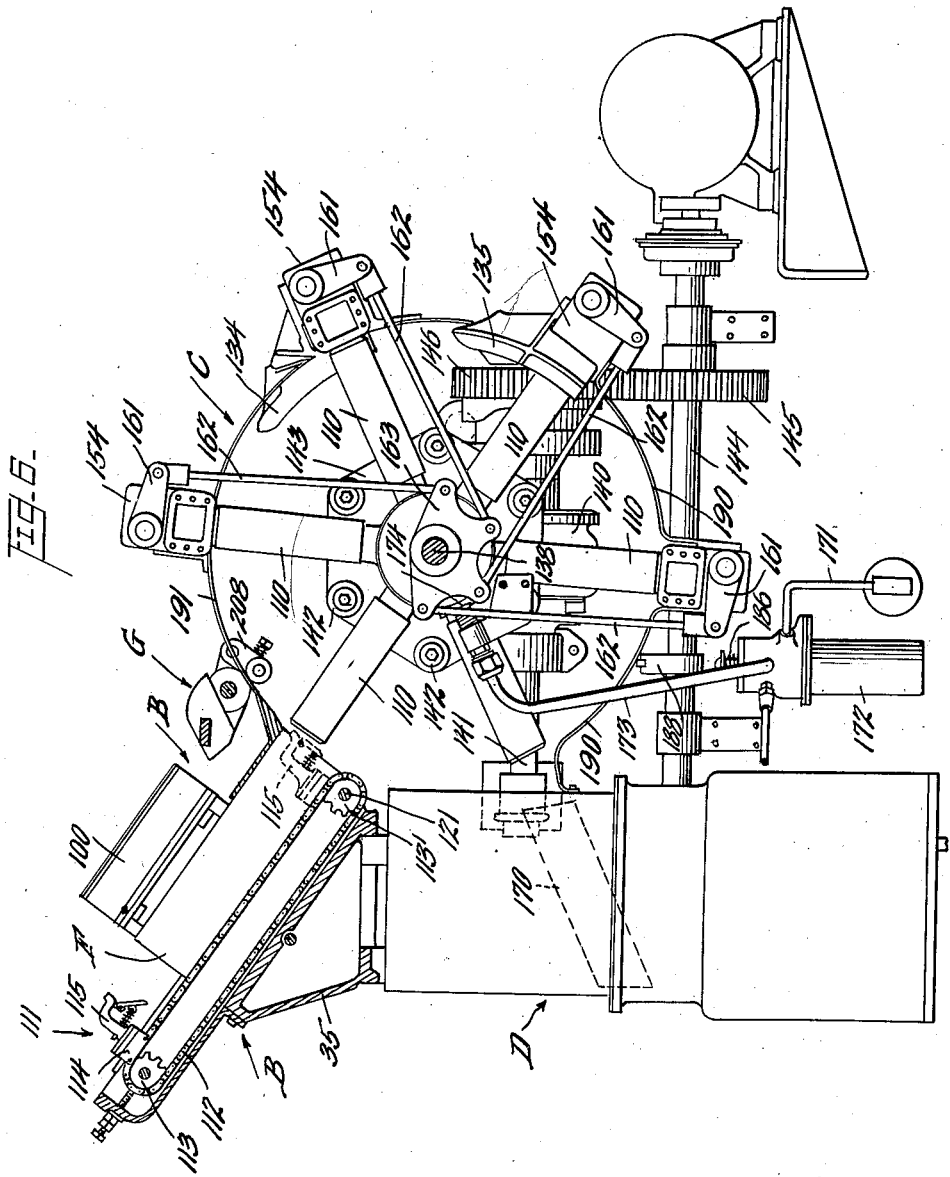

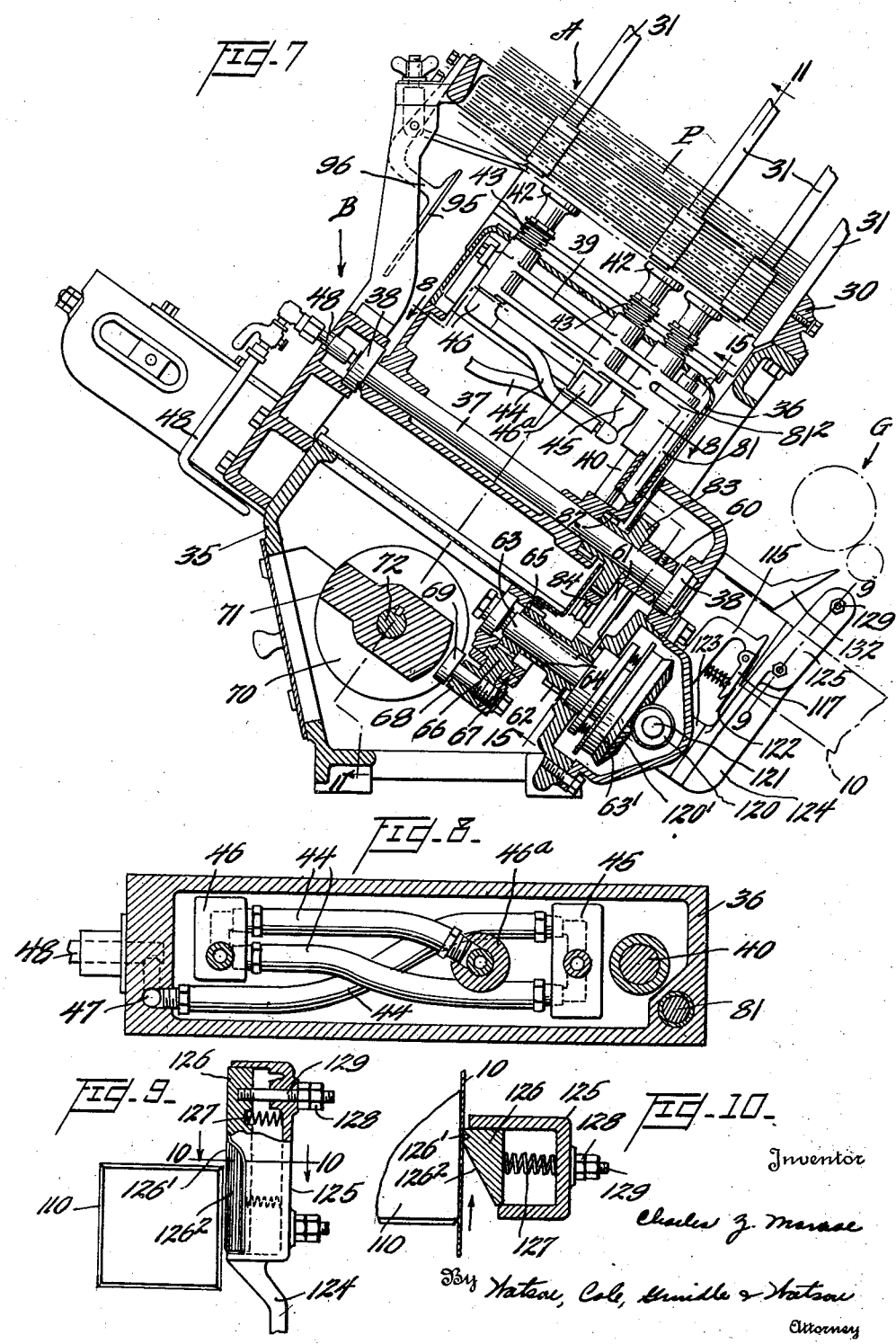

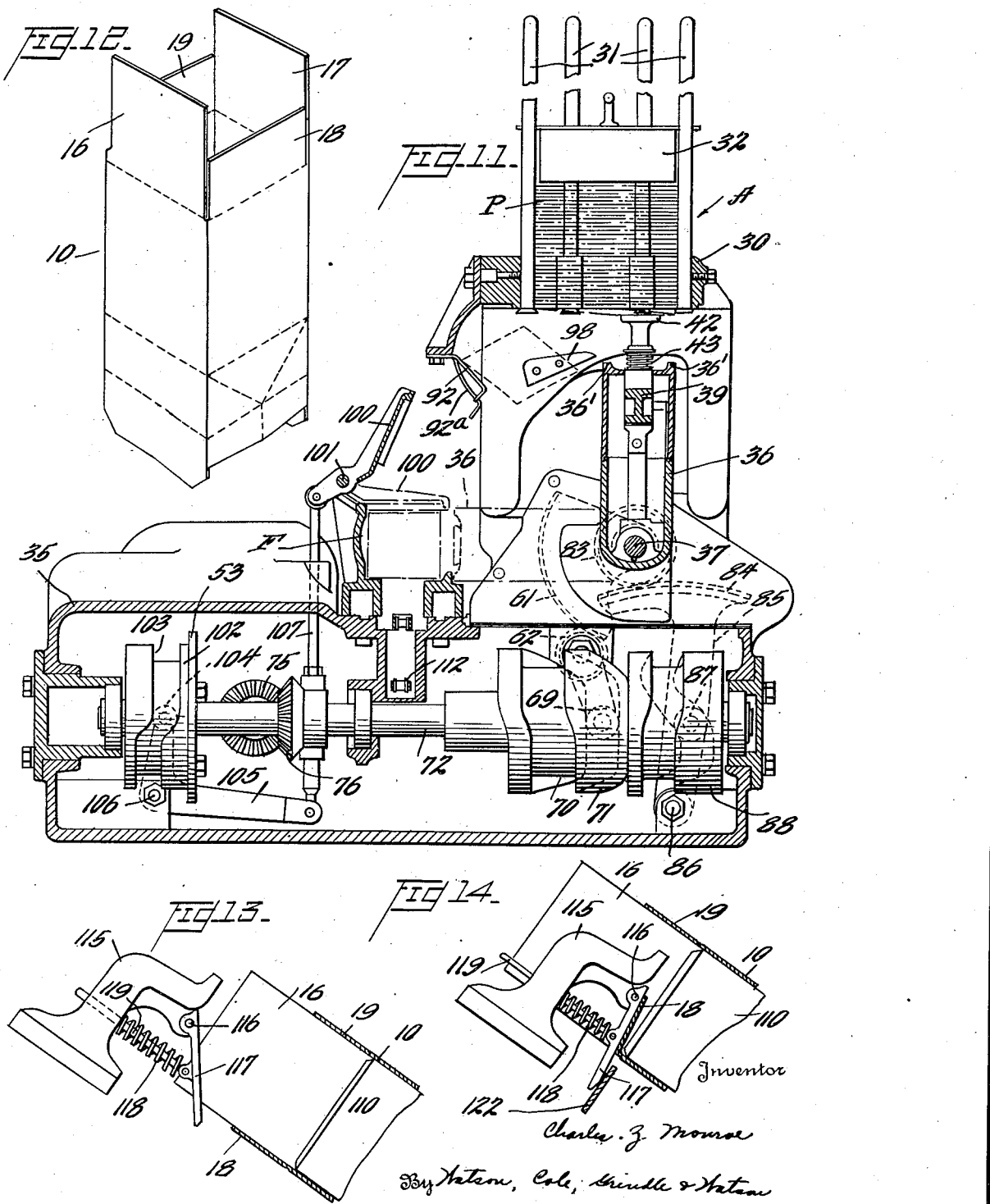

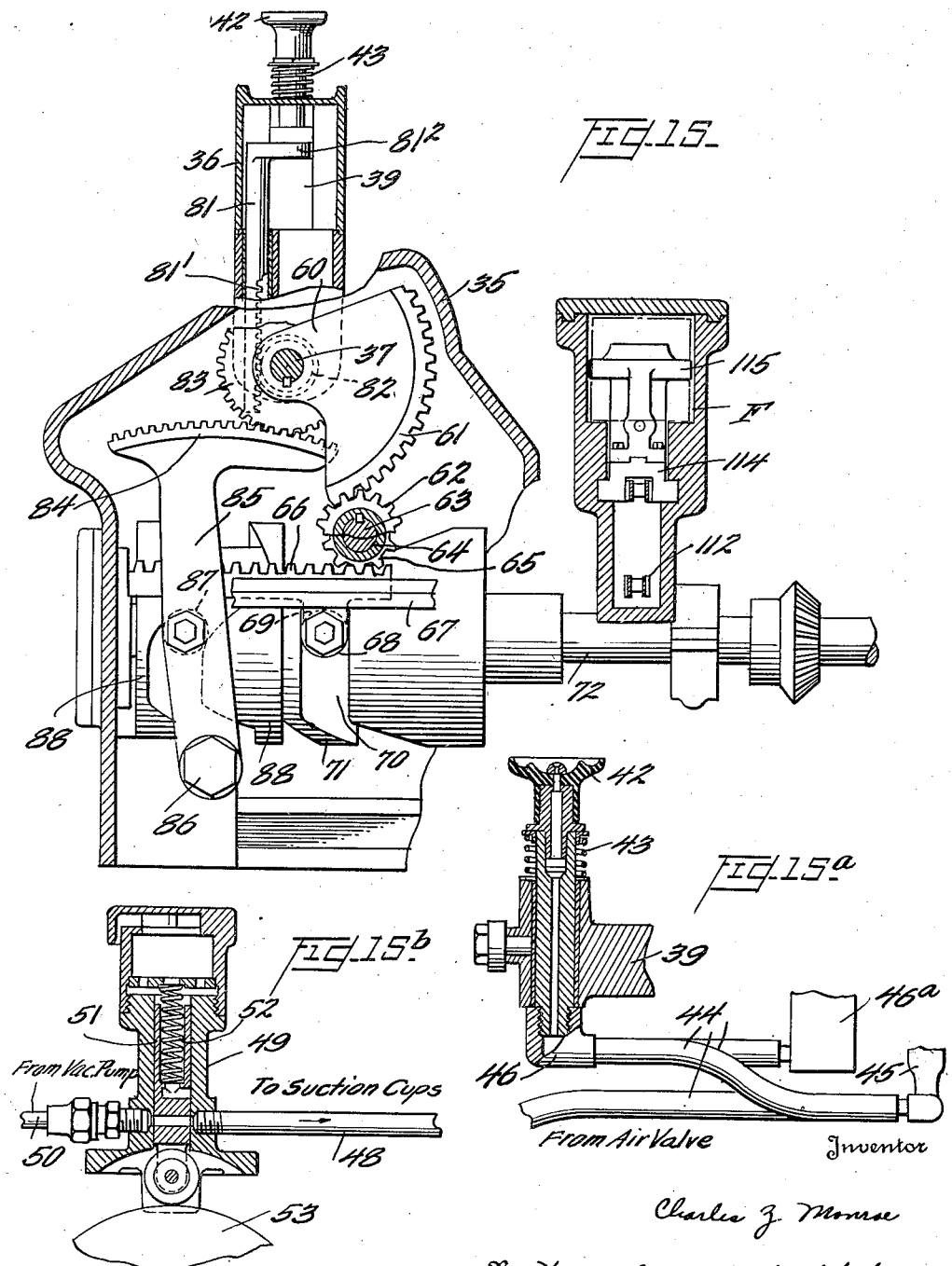

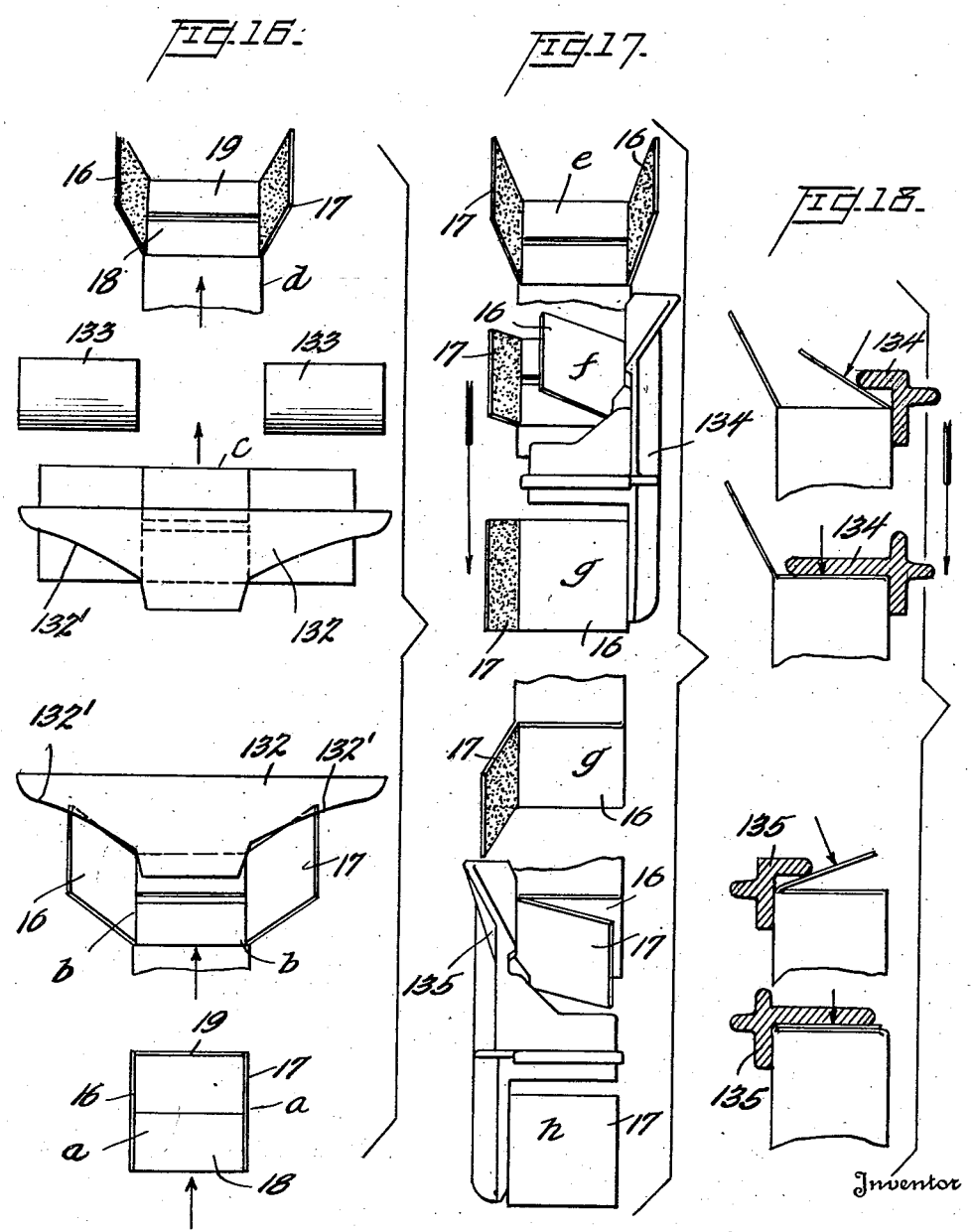

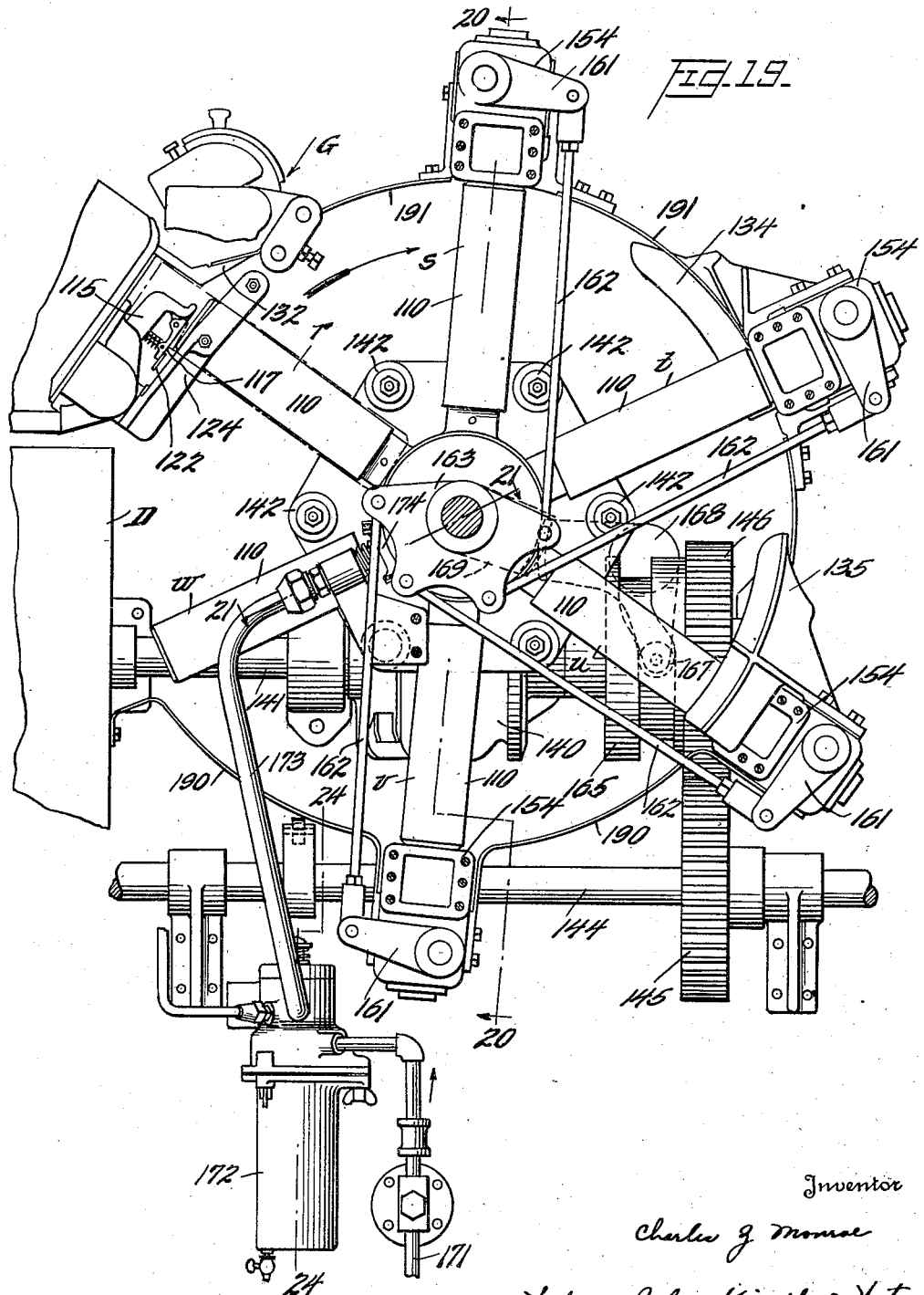

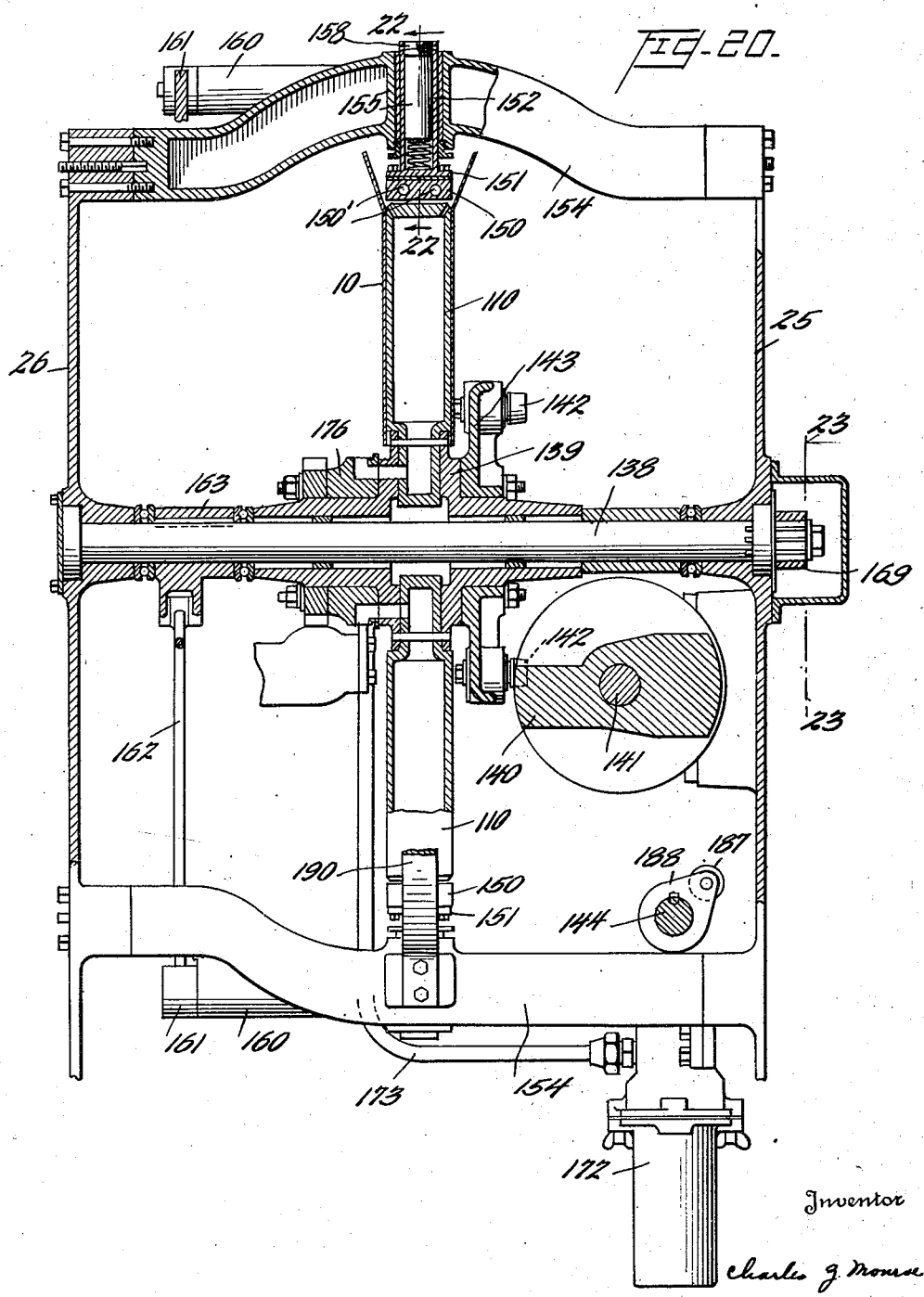

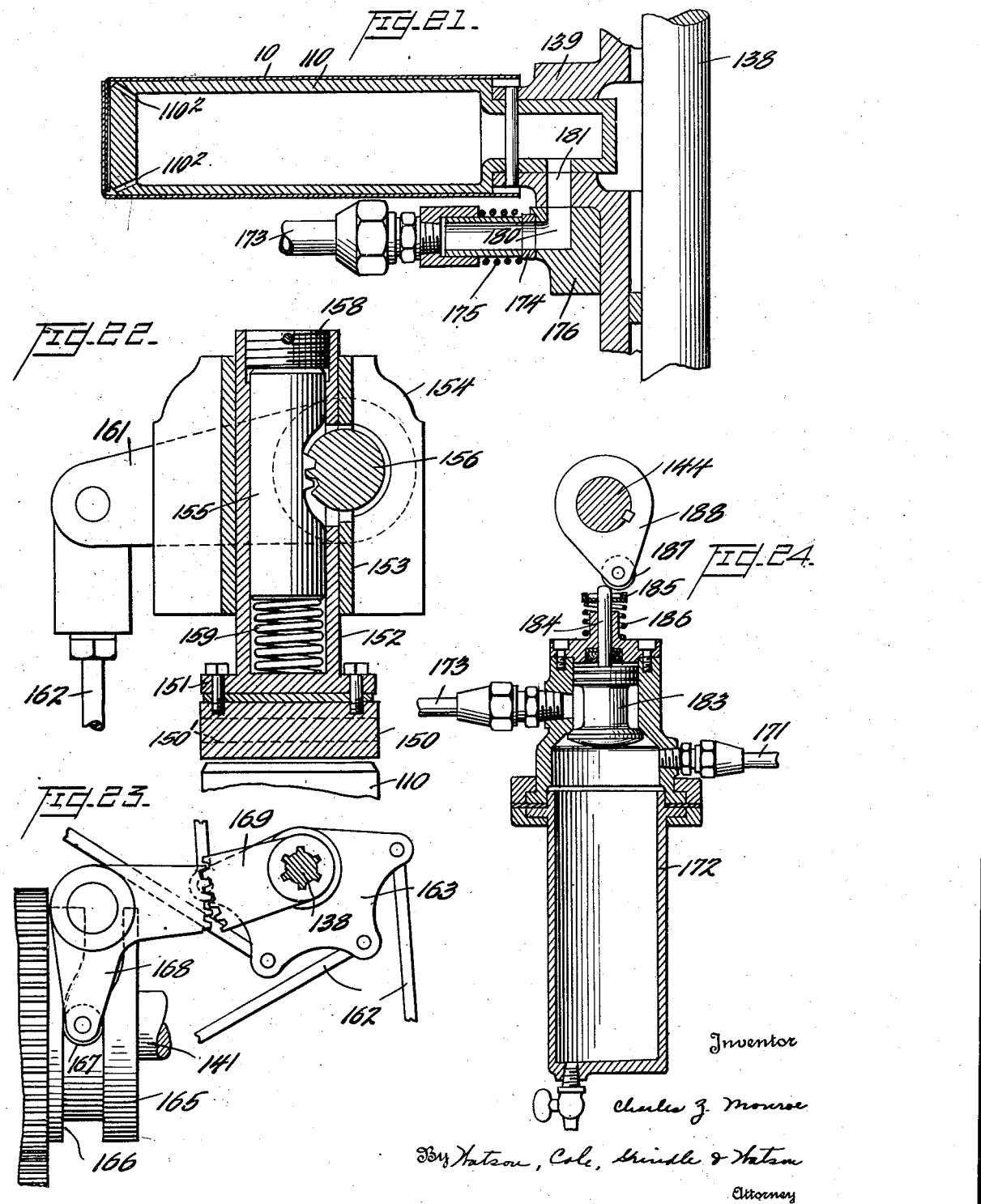

Sept. 5, 1944. C. Z. MONROE 2,357,535
CONTAINER FABRICATING MACHINE
Filed June 13, 1940  11 Sheets-Sheet 11
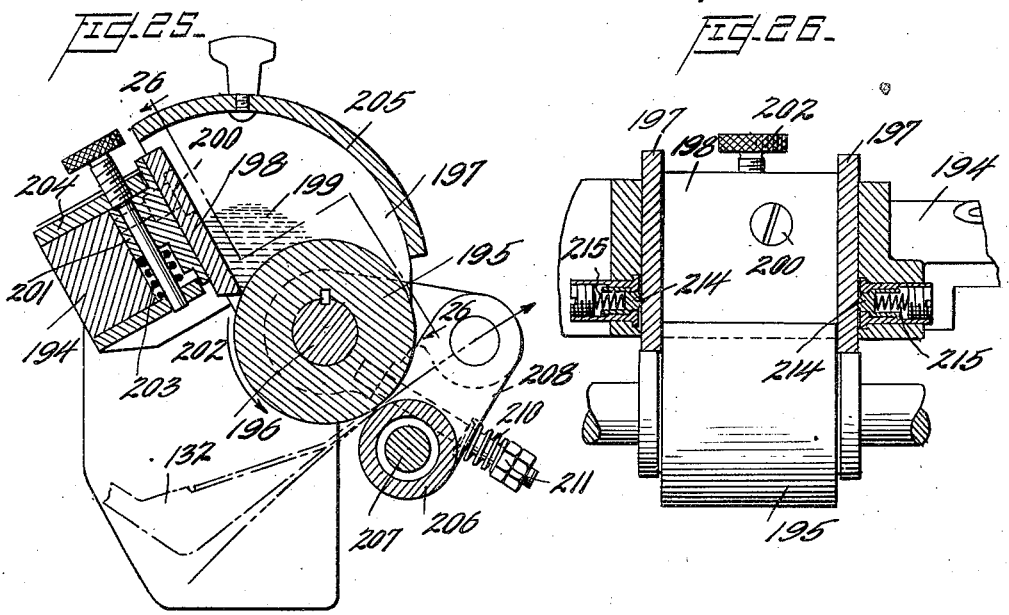
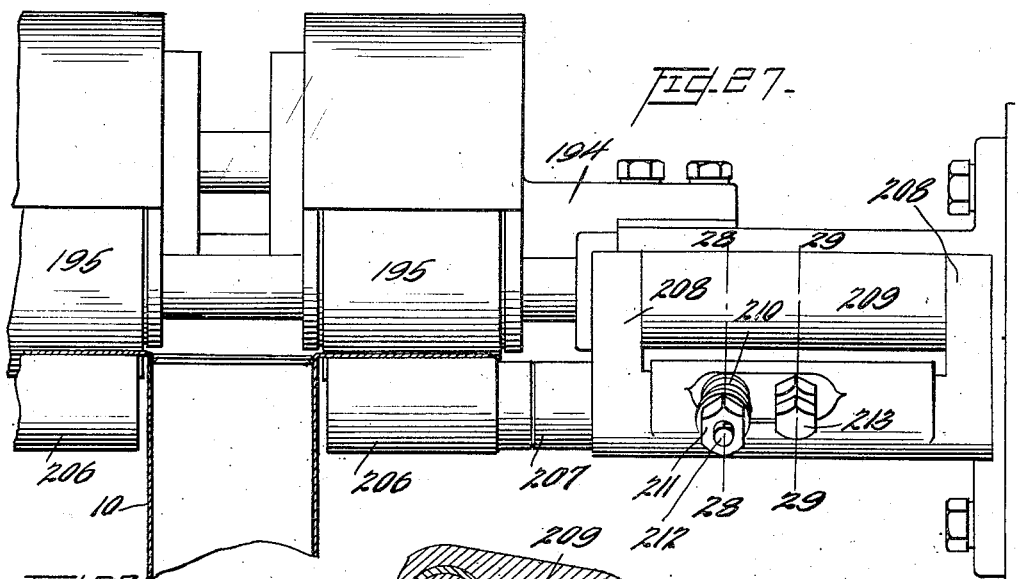
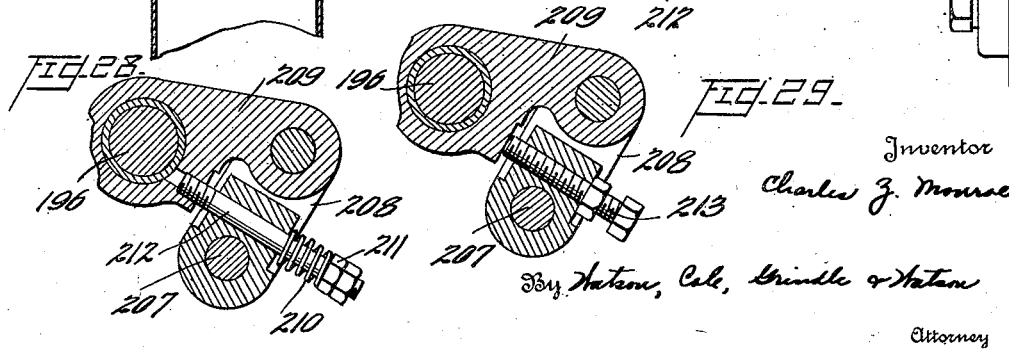
Inventor
Charles Z. Monroe
By Watson, Cole, Grindle & Watson
Attorney Patented Sept. 5, 1944

2,357,535

UNITED STATES PATENT OFFICE 2,357,535

CONTAINER FABRICATING MACHINE

Charles Z. Monroe, Detroit, Mich., assignor to The American Paper Bottle Company, Toledo, Ohio, a corporation of Ohio Application June 13, 1940, Serial No. 340,358

10 Claims. (Cl. 93—44.1)

This invention relates to mechanisms for fabricating containers and more particularly to mechanisms for automatically forming containers or bottles from previously cut and scored paper blanks.

A paper container or bottle which has been found to be eminently suitable for use in the packaging of various commodities, including liquid food commodities such as milk, is disclosed in Patent No. 2,047,891, issued July 14, 1936, in the name of Henry T. Scott. It comprises a single blank of sheet paper scored so as to be divided into a plurality of panels, the panels being folded relatively to each other along the scorings and certain panels being so secured to certain other panels that an elongated tubular container of rectangular cross-section results which, when suitably coated, may be used for the storage and transportation of liquids. Containers of this type occupy but small space for a given volume of contents, are amply strong, low in cost, and may be readily fabricated upon machines designed and constructed to perform the various necessary container forming, charging and sealing operations.

The blanks from which the containers are made are cut and scored, in the usual case, at the plant or factory of a paper fabricator and likewise have two edges joined together by a suitable adhesive so that a tubular member is formed which tubular member, however, is flat or collapsed and may be packed and transported with other in large numbers, in pack formation, being square out or opened and formed into tubes only at the points of consumption, for instance, in dairies. In copending application Serial No. 203,934, filed April 23, 1938, by R. D. Bennett and Charles Z. Monroe there is disclosed an automatically operating mechanism for squaring out collapsed containers of this type, closing the bottom or one end thereof, and then transferring the squared-out and end closed tubular container to a further mechanism in which it is submitted to additional fabricating operations. The mechanism which comprises the subject matter of the application referred to includes suction gripping devices for engaging the end or outside blank of a pack, removing such gripped blank from the pack without removing any other, squaring out the blank into the form of a tube of rectangular cross-section and thereafter closing one end, i. e., the end which is to become the bottom of the completed container, four bottom flaps hingedly connected to the four side walls of the container, respectively, being coated with glue over certain areas and consolidated into a single multi ply bottom by the application of heat and pressure after folding. The mechanism disclosed and claimed in the aforesaid patent application has been widely used with success in the production of very large numbers of paper containers.

One purpose of the present invention, however, is to provide a mechanism which, while generally similar in type and function to that disclosed in the application referred to, is substantially simpler in construction and less bulky and less costly to build and operate. By the novel rearrangement of the major units of the mechanism, involving the repositioning of the pack holding means and the bottom forming mechanism with respect to each other, the overall height and length of the entire mechanism is reduced and a substantial number of operating parts eliminated without sacrifice in speed of operation or quality of product. In a preferred embodiment of the invention, the details of which will be hereinafter described at length, the blank gripping and squaring-out mechanism is disposed above but to one side of the bottom forming mechanism, instead of directly above this last mentioned mechanism as heretofore, the squaring-out mechanism being superposed, as a matter of fact, upon the means provided for coating the containers, and the blanks being fed downwardly in an inclined direction from the squaring-out mechanism to the bottom forming mechanism and downwardly in a reversely inclined direction from the bottom forming mechanism to the coating or other succeeding mechanism. A substantial amount of head room is thus saved and likewise by rearranging the major units of the mechanism in the manner described, the elimination of many costly operating parts is made possible.

In the drawings a preferred form of the invention is fully illustrated and this form will be hereinafter described in detail. It will be appreciated, however, that one skilled in the art will readily perceive that minor changes in the design and arrangement of the component elements of the invention may be readily made to adapt the same to the fabrication of bottles or containers of different sizes and shapes.

In the drawings:

Figure 1 is a plan view of a scored blank from which a bottle or container is to be partially formed by the mechanism which comprises the subject matter of the present invention;

Figure 2 shows the blank with the edges of the side wall panels most remote from each other (Figure 1) joined together adhesively, so that the blank may be said to be a tubular one although flattened, substantially as shown in Figure 3, so that large quantities of blanks may be shipped in pack formation, certain portions of the blank squaring-out mechanism being likewise indicated in Figure 2;

Figure 3 is a section on line 3—3 of Figure 2, one of the blank gripping members of the squaring-out mechanism being also illustrated;

Figure 4 is a diagrammatic view showing portion of the blank squaring-out mechanism and, by means of full and dotted lines, a series of successive positions which the panels of the blank occupy as it is being squared;

Figure 5 is a plan view of the squaring-out mechanism together with portion of the bottom forming mechanism;

Figure 6 is a partial section on line 6—6 of Figure 5;

Figure 7 is a section on line 7—7 of Figure 5;
Figure 8 is a section on line 8—8 of Figure 7;
Figure 9 is a section on line 9—9 of Figure 7;
Figure 10 is a section on line 10—10 of Figure 9;

Figure 11 is a section on line 11—11 of Figure 7;

Figure 12 is a perspective view of one of the containers at the completion of the squaring-out operation and just prior to the bottom forming or end closing operation;

Figures 13 and 14 are detailed views showing a pushing element which forms part of the mechanism and which functions to assist in the transfer of square-out blanks from the squaring-out mechanism to the bottom forming mechanism;

Figure 15 is a section on line 15—15 of Figure 7;

Figure 15a is a section through one of the suction cups of the squaring-out mechanism;

Figure 15b is a section through a valve in the suction line leading to the suction cups;

Figures 16, 17 and 18 are diagrammatic views illustrating the various steps in the process of folding the bottom flaps and closing the container end; Figure 16 including four views to show the downward folding of one of the minor bottom flaps and the spreading and gluing of the major bottom flaps, Figure 17 showing in plan and Figure 18 showing by means of a series of side elevations the successive steps in the method of folding the major flaps of the bottom;

Figure 19 is a side view of the bottom forming mechanism as it is seen when one of the supporting side frames is removed;

Figure 20 is a section on line 20—20 of Figure 19;

Figure 21 is a section on line 21—21 of Figure 19;

Figure 22 is a section on line 22—22 of Figure 20;

Figure 23 is a section on line 23—23 of Figure 20 with all housing parts omitted and likewise various operating parts, in order that certain features of the bottom forming mechanism might be clearly perceived;

Figure 24 is a section on the line 24—24 of Figure 19;

Figures 25 to 29 inclusive illustrate the gluing mechanism, Figure 25 being a section on line 25—25 of Figure 5; Figure 26 a section on line 26—26 of Figure 25; Figure 27 an elevation of the gluing rolls and gluing rolls supporting bracket; Figure 28 a section on line 28—28 of Figure 27; and Figure 29 a section on line 29—29 of Figure 27.

The improved container fabricating mechanism is designed and intended to receive flattened tubular blanks of the type shown in Figures 2 and 3, to square out each blank until it is truly tubular as shown in Figure 12 and to thereafter close one end, for instance the bottom, by a series of operations which may be most clearly understood from an inspection of Figures 16, 17 and 18. As thus completed, with one end only closed, the container is discharged from the bottom forming mechanism and is passed to a further mechanism, such as a coating machine, the function which it is to apply a coating over all of the surfaces of the container, both inside and outside.

The blank 10 shown in Figure 1 is seen to comprise a considerable number of panels, there being four side panels indicated at 11, 12, 13 and 14, respectively, a flap 15, two major bottom flaps 16 and 17, two minor bottom flaps 18 and 19, and various rectangular and triangular panels which, together, comprise the foldable top portion generally indicated at 20, the scorings formed in the blank, and dividing the various panels from each other, being indicated in dotted lines. The blank of Figure 1 is formed into a tube by attaching the narrow marginal flap 15 to the opposite end of the blank, i. e., to panel 14 and portion of the foldable top directly above it, so that the blank appears, when it is fed into the machine now to be described, as it is shown in Figures 2 and 3.

A pack of these blanks is placed in the blank receiving and retaining means generally indicated at A in the drawings and the squaring-out mechanism, generally indicated at B, withdraws the blanks one at a time from the discharge end of the pack, squares it out, and then delivers it to the bottom forming mechanism generally indicated at C, from which, after the bottom has been folded and completed, the container is discharged into a further mechanism, generally indicated at D, to be acted upon further. As indicated in Figure 6 of the drawings, the squaring-out mechanism B is directly above the casing of the mechanism D, which may be a coating apparatus of the type disclosed and claimed in my copending application, Serial No. 203,934, filed April 23, 1938, and the bottom forming mechanism is located to one side, this arrangement being, for reasons hereinafter more fully pointed out, most efficient in that it condenses the necessary operating parts within a minimum space and eliminates necessity for using many parts heretofore thought to be indispensable.

The container fabricating mechanism may comprise only a portion of a complete automatic container fabricating, charging and sealing machine, various elements of which are supported upon parallel vertically disposed side frame members such as those indicated at 25 and 26 in the drawings and it will be understood that the various operating portions of the mechanism are either directly or indirectly supported upon a frame comprising essentially the side frame members 25 and 26 and suitable cross bracing or connecting members.

A pack of collapsed blanks is indicated at P in Figures 7 and 11 and this pack is shown to be disposed at an angle to the horizontal, the lowermost blank of the pack, and all those above it, being disposed at angles of approximately 35° to the horizontal, the various blanks being maintained in pack formation by means of a pack holder comprising a frame 30 and a plurality of guide rods 31 disposed normally to the plane of the frame 30 the lower ends of which are securely attached to the frame. As shown in Figures 7 and 11, the lower ends of certain of the rods 31 are enlarged and comprise supports for the pack, these enlargements engaging the margins of the lowermost blank and sustaining that blank and all of those above and resting upon it until the blank is withdrawn by the squaring-out mechanism, whereupon the pack descends under the influence of gravity, the margins of the succeeding blank being similarly engaged by the enlargements at the lower ends of the guide rods 31. If desired, a weight 32 may be caused to rest upon the uppermost blank of the pack the effect of which is to press downwardly the entire pack and overcome any frictional resistance to descent of the pack which may be offered by the pack guide rods 31.

The squaring-out mechanism B includes a suction gripping device for intermittently acting to remove single collapsed tubular blanks from the pack and square them out so as to form tubes of rectangular cross-section, as shown in Figure 12. This mechanism is mounted upon a frame 35 and it includes an oscillating head indicated at 36 fixed upon the inclined shaft 37 which shaft is rotatably mounted in bearings 38 supported in the frame, together with a blank engaging and gripping supporting slide 39, carried by and movable radially of the oscillating head 36, together with operating mechanism for effecting oscillation of the head and reciprocatory movement of the gripper supporting slide, in timed relationship, from a common source of power.

By reference to Figures 7, 8 and 11 it will be perceived that the oscillating head 36 is in the nature of a hollow casing and that the gripper supporting slide 39 comprises an elongated member generally parallel to shaft 37 and the ends of which are slidably supported in the head, the lower end of the slide being slidably mounted upon a guide post 40 extending radially of the shaft 37, the suction gripping members, three in number, being disposed at right angles to shaft 37 and to the suction gripper supporting slide 39 and projecting through apertures in the head, as shown in Figure 7. The blank contacting portions 42 of the blank gripping mechanism are preferably in the nature of rubber suction cups, normally urged outwardly individually by means of coiled compression springs 43 so that any one or all may yield slightly upon impact against the blank, the immediate tubular support for each of the suction cups 42 being slidably received within a cylindrical recess formed in member 39, each suction cup being maintained in communication with a source of reduced pressure or vacuum by means of a valve controlled conduit which includes a flexible section, these sections being indicated at 44 in Figures 7 and 8, which permit movement of the gripper supporting slide 39 radially of shaft 37. In addition to the flexible sections the suction conduit includes the three fittings 45, 46 and 46a mounted, respectively, upon the lower ends of the tubular suction gripper supports, as shown in Figures 7, 8 and 15a. The interior of fitting 45 is in constant communication with a duct 47 formed in one end of the head 36, which duct communicates with one formed axially in the end of shaft 37 and which is connected by means of tubing 48, valve casing 49 and tubing 50 to the vacuum source.

In the operation of the mechanism the connection between the suction grippers and the vacuum source is periodically established and interrupted by the valve mechanism shown in Figure 15b or by any other suitable valve. In the valve which is illustrated by way of example a slidable perforated valve member 51 is normally urged by a spring 52 in one direction but is periodically moved by a cam 53 in the opposite direction, the cam being operated in timed relationship to the oscillating head 36 so that a blank will be gripped at one station and released at another.

The mechanism for oscillating the head 36 and retracting and advancing the gripper supporting slide 39 will now be described. As previously explained, the head 36 is fixed upon shaft 37. Shaft 37 has also fixed thereon a sleeve 60 and integral with and projecting radially from this sleeve is a toothed quadrant 61 the teeth of which mesh with those of a pinion 62 keyed upon a shaft 63 disposed parallel to shaft 37. Connected rigidly to pinion 62 by a sleeve 64 is a pinion 65 the teeth of which mesh with those of a slide 66 supported for movement in a guide 67 disposed at right angles to and just below the shaft 63, the slide 66 having a lateral extension 68 carrying a cam roller or follower 69. The cam follower 69 projects within the groove 70 of a cam 71 fixed upon a drive shaft 72. It will be observed that, as shaft 72 revolves about its axis, the slide 66 will be reciprocated thus effecting oscillation of the head 36 through the connecting mechanism just described, the head in its cycle of movements moving from the position in which it is shown in full lines in Figure 4, to the position in which it is shown in dotted lines in the same figure, and then back to full line position, as the cam 71 rotates.

The drive shaft 72 referred to is rotated by power transmitted thereto from the short shaft 74, and through the intermediate interengaging bevel gears 75 and 76, shaft 74 being in turn connected to the main drive shaft of the machine by means of a chain and sprocket connection which includes the sprocket 78 fixed on shaft 74 and the chain 79 passing around this sprocket. Chain 79 likewise passes over a sprocket 80 which is an idle sprocket and is adjustably supported in the frame so that the slack which occurs in the chain may be taken up from time to time by transversely adjusting the sprocket. Preferably an electric motor is utilized as a power source and all of the various drive shafts and cams so far described rotate continuously in one direction at uniform speed, the oscillating and reciprocatory movement of the various operating parts being brought about by suitable arrangements of interposed mechanical elements.

The reciprocatory movements of the suction gripper supporting slide 39, radially of the shaft 37, are effected by means which includes the operating rod 81 slidably supported in parallelism with the guide post 40, rod 81 having its inner end formed as a rack 81', the teeth of which mesh with those of a pinion 82 mounted upon shaft 37 for free rotation with respect thereto, pinion 82 being integral with a gear 83 of larger diameter the teeth of which mesh with those of a segment 84 on the end of a lever 85 pivotally secured to the frame at 86. Lever 85 carries, intermediate its pivot 86 and the segment 84 a cam follower 87 which projects into a cam groove formed in cam 88 fixed upon shaft 72 closely adjacent to the previously mentioned cam 71. As shaft 72 rotates, therefore, lever 85 will swing angularly about pivot 86, first in one direction and then in the reverse direction, and by reason of the gearing connecting the segment 84 and the rack 81' the rod 81 will be reciprocated radially of the shaft 37, thus causing the suction gripper supporting slide 39 to be reciprocated, the outer end of rod 81 having a lateral extension 81² which projects into a slot formed in member 39. The cams 71 and 88 are so formed with relation to each other that the radial movements of the suction gripping elements are perfectly synchronized with the movements of the oscillating head in effecting the squaring-out of a tubular blank in the manner now to be described.

While the oscillating head 36 is in the position in which it is shown in full lines in Figure 4, the suction gripping elements 42 first occupy the positions in which one is shown in full lines in that figure, the gripping face of the element being practically in the plane defined by the spaced parallel edge surfaces 36' of the oscillating head. While head 36 remains stationary, however, the suction gripping elements are quickly advanced by the mechanism described to approximately the positions indicated in dotted lines in this figure and as shown in full lines in Figures 7 and 11, the three rubber suction cups being thus caused to engage the lowermost blank of the pack P at the points indicated by dotted circles 90 in Figure 2, the interior of each cup being placed in communication with a source of reduced pressure so that the cups firmly grip and securely hold the panels of the blank with which they have been brought into engagement. Thereafter, and before there is any movement of the head 36, the member 39 and the various suction cups are retracted so that each cup again occupies a position similar to that of the cup shown in Figure 4 in full lines, the engaged panels of the blank having their margins resting against the edges 36' of the face of the head 36 and being thereby supported during subsequent squaring-out operations.

Naturally retraction of the suction cups after engagement with the blank withdraws the blank from the pack, slightly flexing and pulling it past the enlarged ends of the pack supporting guide rods 31, the entire pack descending by the thickness of one blank. Immediately thereafter the head oscillating mechanism becomes active to rock the head 36 from the position in which it is shown in full lines to the position in which it is shown in dotted lines and during its travel through approximately an angle of 90° the blank contacts in succession various stationary elements which result in its opening, the squared-out container being finally placed in the upper end of a chute generally indicated at F, the suction grippers being released and retracted, the container remaining in the chute, down which it is then moved toward the bottom squaring mechanism.

It will be observed from Figure 4 that the leading edge of the collapsed tubular container as it is moved along an arcuate path by the head 36 will strike the first of two stop members 92, 92a (spaced apart longitudinally of the container as shown in dotted lines in Figure 5) and positioned without the path of movement of the suction grippers 42. Stops 92, 92a cause the container to first open fully and thereafter to collapse in the reverse direction, thus flexing the scored portions intermediate the side panels in such manner that the container will tend to maintain a rectangular cross-section after it has completely passed the stops. It sometimes happens that the end flaps of collapsed tubular containers of the type described are accidentally deflected out of their proper positions so that their adjacent edges cross and thus to a certain extent interlock and oppose the free opening movement of the container. This is true of the flaps at both ends of the container, and to ensure that any tendency of the flaps at the ends of the container to interlock with each other is corrected, means is provided for engaging and acting on such flaps as the container blank is moved toward contact with the stationary stops 92. Such means are diagrammatically illustrated in Figures 2 and 4 of the drawings. A bottom flap separating cam is indicated at 95 and is shown to be a crescent-shaped cam-like member supported from the frame of the pack holder by means of a bracket extension 96 and lying in such position that it will clear the ends of the minor flaps 18 and 19 (see Figure 2) but will deflect upwardly one of the major flaps (flap 16) and deflect downwardly the other major flap (flap 17) as the blank is moved along its arcuate path, thus avoiding tendency of the adjacent edges of the flaps to cross and interlock. The relatively small cam-like member 98 lies in the path of movement of the end flaps of the closable top of the blank, which end flaps are indicated at 12' and 14' in Figure 2 and, as the blank is swung along its arcuate path, cam member 98 will deflect one of these end flaps upwardly and the other downwardly, thus completely separating their adjacent edges. The approximate position of member 98 with respect to the blank at one stage in the movement of the blank is indicated in Figure 2 and this member is rigidly mounted upon the frame of the squaring-out mechanism, as shown in Figure 11. Cam-like member 98 is positioned in advance of member 95 and cooperates with the advanced stop 92 in effecting the opening of the top of the blank slightly in advance of the bottom thereof. This causes progressive separation of the inner faces of the container from one end to the other which facilitates opening, especially if any areas of such surfaces tend to adhere to each other for any reason. As the trailing corner of the container disengages the stop 92a it becomes substantially rectangular in section and immediately thereafter reaches the final position in which it is shown in Figure 4, within the chute generally indicated at F. Following this, the connection between the suction gripping members 42 and the source of reduced pressure is interrupted to release the blank and the suction grippers themselves retracted into the recessed face of the oscillating head, ready for the return movement of the casing.

Promptly upon the movement of the squared-out container into the chute, the chute is closed by the movement of a gate member 100, which is pivoted at 101, from the position in which it is shown in full lines in Figure 11 to the position in which it is shown in dotted lines, the container just inserted into the chute being thereby retained loosely against movement transversely of the chute. The swinging gate 100 is actuated in timed relationship with the other operating parts just described by power taken from are contacted by the leading vertical edges of the major flaps 16 and 17 with the result that these major flaps are cammed outwardly, being gradually bent downwardly about their lines of attachment to the container body until, when the container body reaches the position c they are disposed in a common plane and are at right angles to the side panels to which they are attached.

Also, as the container moves from position a to position b, the minor flap 19 will strike the spreader 132 and be downwardly deflected so that, in position c, all four bottom flaps are in a common plane transverse to the axis of the container, the minor flaps having been folded inwardly and the major flaps outwardly. Thereafter the container passes from position c to position d, the major flaps 16 and 17 passing, on the way, under the glue rolls diagrammatically indicated at 133 so that coatings of glue are applied to the upper surfaces of the two major flaps. Immediately after passing the glue rolls the container bottom is as indicated in position d, means to be later described retaining the minor flaps in the positions in which they are shown, the major flaps having sprung partially back to their original positions. After the container bottom has been subjected to the operations just described, it only remains to fold the major flaps of the bottom down and cause them to strongly adhere to the minor flaps and to each other and these folding operations are indicated in Figures 17 and 18, the container passing from position e beneath a folding cam 134 which causes the major flap 16 to be folded downwardly, this flap being indicated in position f to be partially folded and in position g to be wholly folded, being retained in position by the adhesive previously placed upon its inner surface. Finally, by means of a stationary folding cam 135 the major flap 17 is folded down upon the major flap 16 (position h) and the bottom is completely finished, the bottom closing operations being facilitated by the use of heat and pressure, applied by means now to be described.

The various mandrels 110 of the bottom forming mechanism are disposed radially of the horizontal transversely extending shaft 138 the ends of which are mounted in suitable bearings in the side frames of the machine, the reduced inner ends of these mandrels being closely received within recesses formed in a hub or spider 139, as clearly shown in Figure 20, spider 139 being freely revoluble upon the supporting shaft 138. The mandrels 110 are hollow and rectangular in transverse section. The hub 139 and the mandrels, of which there are six, and which are equidistantly spaced angularly around the axis of the hub, are given an intermittent advancing movement in the direction of the arrow shown in Figure 19 by an indexing mechanism which is substantially of the type disclosed in the application previously mentioned, this mechanism including an indexing cam 140 mounted upon a countershaft 141 extending longitudinally of the machine, the cam track of the indexing cam being adapted to successively receive and advance the several studs 142, there being one stud for each mandrel and the several studs being angularly spaced about the axis of shaft 138, as are the mandrels, the studs being mounted upon a stud supporting plate 143 which is rigidly secured to the hub or spider 139. The countershaft 141 is driven by power taken from the power shaft 144 through the intermeshing gears 145 and 146, the gears being fixed to the respective shafts upon which they are mounted.

The power shaft is continuously driven by means of an electric motor and hence the countershaft 141 is rotated at the same speed, the gears 145 and 146 having the same diameter. The indexing cam 140, however, effects the intermittent advancing movement of the spider and mandrels and the movements of the mandrels are of course synchronized with the movements of the pusher of the squaring-out mechanism previously described so that, whenever the pusher descends moving a squared-out container before it, there is a mandrel positioned to receive the container, the advancing movement of the mandrels taking place while the pusher is on its return stroke.

In Figure 19 the mandrel 110, which is at position r, has just received a container, which is shown in chain lines. This mandrel with container thereon next moves to position s and in moving from position r to position s the end flaps are manipulated by the spreader 132, which is shown to be attached to the frame of the squaring-out mechanism in the manner indicated diagrammatically in Figure 16, and likewise glue applied by the gluing mechanism, generally indicated at g, the container at position s having its minor flaps folded across the end of the mandrel and its major flaps, to which glue has been applied, in slightly divergent relationship, as indicated in Figure 20. At this point the minor flaps are subjected to heat and pressure by means to be described. When the mandrel 110 moves from position s to position t the major flap 16 is downwardly deflected and brought into contact with the previously positioned minor flaps, by the cam means 134 and at station t heat and pressure are applied to cause major flap 16 to firmly adhere to the minor flaps. After this has been done and the pressure released, the mandrel is moved to position u, the major flap 17 having been downwardly deflected on the way by the stationary cam device 135 and at position u there is the further application of heat and pressure. Then the mandrel moves to position v the four bottom flaps are again subjected to heat and pressure and finally, when in position w, which is the discharge position, the container with its bottom fully closed is blown downwardly and outwardly off of its supporting mandrel by the use of compressed air. When the container moves next to its original position r it has completed the cycle of movement and is ready to receive a fresh container.

It will be observed that at the four stations s, t, u and v means is provided for applying heat and pressure to those container bottom flaps which overlie the end of the mandrel. One device for doing this is illustrated in Figures 19, 20 and 22. Referring first to Figure 22. A pressure pad is indicated at 150, this pad being a generally rectangular metallic block provided with cylindrical recesses 150' to receive heating elements of suitable type, for instance electrical resistance elements and by means of which the temperature of the pressure pad 150 may be maintained at the degree desired. The electrical connections may be conventional and are not illustrated and other heating means may be employed if desired, for instance steam may be utilized as the heating medium instead of electricity.

The pressure pad is connected to the bottom flange 151 of a cylindrical sleeve-like member 152 supported for movement in a cylindrical guide 153 which is in turn carried by the transversely extending cross bridging member 154, the ends of which are rigidly connected to the side frame members of the machine. Within this sleeve-drive shaft 72, there being a third cam 102 fixed upon this shaft and having a cam track or groove 103 within which rolls the cam follower 104, the cam follower being rotatably supported on one arm of a bell crank lever 105, pivoted at 106 and the opposite end of which is pivotally connected to a link 107 which operatively connects the bell crank lever to the gate 100.

With the container positioned in the chute as just described, it is next in order to move it longitudinally downwardly to transfer it to the bottom forming mechanism C, which mechanism includes a plurality of mandrels 110 for receiving and interiorly supporting the squared-out containers, the mandrels being supported for angular movement about a fixed axis and extending radially of said axis, the chute itself being likewise disposed radially of the axis of the bottom forming mechanism C so that it is possible for each mandrel to be successively brought into alignment with the lower or discharge end of the chute, to successively receive squared-out containers.

The means for forcing downwardly onto one of the mandrels 110 a squared-out container which has been deposited in the chute comprises essentially a pusher member generally indicated at 111 and which is mounted upon an endless chain 112 which passes around sprockets 113 and 113', revolubly mounted in the frame of the squaring-out mechanism, the upper sprocket being adjustable in a direction parallel to the chute to maintain the proper tension in the chain. The pusher includes the supporting block or base 114 which is directly secured to the chain and may even be a link in the chain, and the hook-shaped bracket 115 secured to block 114. Pivotally connected at 116 to the bracket 115 is a presser foot 117 which is normally urged downwardly by a coiled compression spring 118 to the position in which it is shown in Figure 13, the lower end of the spring bearing on the presser foot and the upper end bearing against the bracket 115, the spring 118 being maintained in position by means of a guide rod 119 the lower end of which is pivotally connected to presser foot 117 and the upper end of which passes through an aperture formed in the bracket and is freely slidable therein. The pusher is caused to reciprocate from its uppermost position in which it is shown in full lines in Figure 6 to its lowermost position, in which it is shown in dotted lines in the same figure, in synchronism with the other operating parts, being in fact driven by power taken from the cam actuated shaft 63, through a safety clutch 63', bevel gear 120', bevel pinion 120, and shaft 121 upon which the lower sprocket 113' is fixed. As shaft 63 transmits, as has been previously pointed out, the power from the drive shaft to the oscillating head, it is clear that the pusher must necessarily be actuated in synchronism with the oscillating head and the driving connection is such that it will always be in its uppermost position at the time when a squared-out container is delivered into the upper end of the chute.

The relationship between the pusher and the upper end of a squared-out container positioned in the chute, just prior to the time when the pusher is actuated, may be readily perceived upon an inspection of Figure 13. The bottom of the squared-out container, with its major and minor bottom flaps, is uppermost and the presser foot 117 of the pusher is in position to contact with the upper edge of the minor flap 18 when the pusher descends. As it starts downwardly the minor flap strikes and inwardly deflects the minor flap 18 and the spring 118 is partially compressed during the movement of the container down the chute, as indicated in Figure 14. This relationship of presser foot and container is maintained until the pusher has reached its lowermost position, whereupon the free edge of the presser foot strikes a fixed stop 122 and the spring 118 is further compressed and the minor flap 18 further deflected, the lower surface of the bracket 115 rather closely approaching the adjacent end surface of the mandrel but not so close as to actually pinch or grip the deflected minor flap 18.

Downward movement of the container is halted when the score lines intermediate the side wall panels and the bottom flaps are precisely in the plane of the end surface of the mandrel so that, when the remaining bottom flaps are subsequently folded, they will be folded precisely along and not above or below the score lines. To prevent the squared-out container from inadvertently slipping downwardly on a mandrel beyond the point to which it is intended that the pusher shall move it, a retarding device of frictional type is provided, this being most clearly illustrated in Figures 7, 9 and 10. Thus, to a downward extension 123 of the frame of the squaring-out mechanism is secured a transversely extending bracket member 124 on the end of which is a housing 125 within which housing is a friction plate 126 normally pressed outwardly to the position in which it is shown in Figures 9 and 10 by springs 127, and restrained against further outward movement by nuts 128 on threaded studs 129. The surface 126' of the friction plate 126 is normally positioned so as to just clear the adjacent surface of the mandrel 110 which may be brought into alignment with the chute, the distance separating these mutually facing surfaces being somewhat less than the thickness of the paper from which the container is fabricated. Hence the intermediate wall of the container, which is moved in the direction of the arrow shown in Figure 10 when being positioned onto the mandrel, is lightly pinched between the mandrel surface and the friction plate 126 and its movement frictionally retarded. The inclined surface $126^2$ of the friction plate 125 is simply a guide surface to ensure that the top flaps of the descending squared-out container pass between the friction plate and the mandrel surface. By reason of the frictional retarding means just described each container applied to a mandrel is halted precisely at the position to which it is moved by the pusher.

In Figures 16, 17 and 18 the various stages involved in the folding of the bottom flaps of the container, which steps are performed by the bottom closing mechanism now to be described, are diagrammatically shown. As the container is delivered by the pusher onto the mandrels 110 it appears, when viewed above, as it is shown at position $a$ in Figure 16, the minor flap 18 having been downwardly deflected and being still held in downwardly deflected position by the pusher, the remaining minor flap 19 and the two major flaps 16 and 17 still remaining in the planes of the side walls to which they are attached. The advancing movement of the mandrel moves the container from position $a$ to position $b$ in which position it is shown to have passed part-way beneath a spreader member 132 the inclined and forwardly diverging forward edges 132' of which like member 152 is positioned a plunger 155 provided with several teeth on one side intermediate its ends, as shown in Figure 22, which teeth mesh with teeth formed upon a horizontally supported rotatable shaft 156, rotation of which about its axis will either raise or lower plunger 155. When the plunger is raised it carries with it the sleeve 152, the upper end of this sleeve being closed by a plug 158 against which the plunger bears, and when the plunger 155 is lowered it moves the pressure pad downwardly into contact with any container flaps which may have been folded across the end of the mandrel 110 directly below it. Thereafter movement of the pad 150 is interrupted but rotation of shaft 156 is continued to compress the spring 159 thereby forcing the pad against the paper end flaps of the container with the desired degree of pressure. Shaft 156 is rotatably supported in the bearing 160 integral with the bridging member 154 and upon the outer end of the shaft there is fixed a lever arm 161 the end of which is connected by means of a link 162 to a member 163 mounted upon the shaft 138, the hub of member 163 being keyed to the shaft as shown in Figure 20.

It will be understood that there are four pressure pads to act simultaneously upon the bottoms of the containers at mandrel positions s, t, u and v and that there are four pressure pad heating and operating mechanisms such as that which has just been described, four links 162 being connected to the member 163 fixed on shaft 138. Rotation of member 163 on shaft 138, therefore, causes the simultaneous movement of the pressure pads upon their working strokes or upon their release strokes and such movements are effected in timed relationship with all of the other operating parts of the mechanism heretofore described by the means shown in Figures 19 and 23. Thus there is fixed on the countershaft 141, in addition to the indexing cam 140, a pressure pad actuating cam 165 with the cam track 166 on which there rolls a cam follower 167 which is mounted for rotation upon the end of one arm of a bell crank lever 168 pivotally supported upon the frame of the machine. The extremity of the other arm of the bell crank lever 168 is formed as a toothed segment and the teeth thereof mesh with those formed upon the end of a lever 169 keyed upon shaft 138. Hence, as shaft 141 revolves, shaft 138 will be intermittently oscillated through the mechanism described and the various pressure pads moved radially inward and subsequently withdrawn, in synchronism with the movements of the mandrels.

It will be appreciated that at station s the associated pressure pad acts only upon the folded minor flaps of a container. It has been found to be highly advantageous to subject these minor flaps to heat and pressure at this point to drive out contained moisture prior to the time when the adhesive coated major flaps are brought into contact therewith, a stronger bottom due to more effective action of the adhesive resulting when this precaution is taken.

A mandrel at position w supports a container which has been subjected to all bottom closing operations and is ready to be discharged. Discharge of the container at this point is automatically effected by means of compressed air, air under pressure being introduced into the interior of the mandrel and issuing from the mandrel end through a plurality of relatively small ducts such as indicated at 110², the outlet ports of which are preferably at the corners of the mandrel and in communication with the small space between the bevelled edges of the mandrel and the inner surfaces of the container at the corners thereof. The air is discharged under such pressure that the container is quickly blown from the mandrel and, with an arrangement of mechanisms such as disclosed, is passed on to the mechanism enclosed within the housing D, passing through an aperture in the side wall of this housing and then into a basket or receptacle 170 which forms part of a mechanism for applying a liquid proofing coating over the inner and outer wall surfaces of the container, and which mechanism is fully disclosed in my copending application, Serial No. 203,934, filed April 23, 1938.

The compressed air utilized in blowing the container from the mandrel at the discharge station w of the mandrel may conveniently be placed under pressure by a relatively small pump, to the outlet port of which the air conducting line 171 is connected. Conduit 171 leads to an air reservoir 172 of relatively large size and which functions not only as a reservoir but likewise as a settling chamber in which the air is stored for some time, thus permitting heavier particles of dust and dirt to settle. A conduit 173 connects the upper end of the air storage reservoir to a central aperture in a shoe 174 which is normally urged by a spring 175 to tightly engage a ring 176 which may be designated a distributor ring and which encircles the hub 139 and is fixed thereon.

The inner face of the spring pressed shoe 174 slides over the cylindrical outer face of the distributor ring 176 as the hub revolves and whenever a mandrel comes to rest in position w, i. e., the unloading position, the aperture in the shoe 174 comes into register with an aperture 180 formed in the distributor ring, which aperture communicates with the interior of the adjacent mandrel through a duct such as 181 extending parallel to the shaft 138. It is clear, therefore, that there is communication between the interior of any mandrel positioned at the discharge position w and the upper end of the air reservoir 172. However, compressed air cannot flow from the air reservoir to the mandrel unless and until the valve 183, slidably mounted within the upper end of the air reservoir, is unseated. Valve 183 is provided with a stem 184 having a collar 185 at its upper end retained in position by a cotter pin or the like, this collar comprising the upper abutment for a spring 186 the lower end of which rests upon the head of the air reservoir. The upper end of the stem 184 lies in the path of movement of a roller 187 rotatably mounted upon the peak of a cam 188 fixed upon the power shaft 144 and it is therefore clear that the roller 187 will contact with and depress the stem 184, and thus unseat valve 183 once for each revolution of the power shaft.

The cam is naturally so disposed upon the shaft that the valve 183 is unseated at the proper time, i. e., when a mandrel bearing a container reaches and stands at the unloading position w. It may be said that arcuate bands 190, centered on the axis of shaft 138 and disposed in the plane which includes the axes of the several mandrels, will prevent accidental discharge of a container from the mandrel upon which it has been placed while the mandrel is moved from station u to station v and from station v to station w. Similar narrow arcuate bands 191 at the top of the apparatus serve to prevent the minor bottom flaps of the container, one of which has previously been bent downwardly by the pusher and the other by the spreader, from springing upwardly before the first of the major bottom flaps, with its coating of moist adhesive, is brought down upon these flaps to retain them in container end closing position. The arcuate bands 190 and 191 are suitably supported at their ends, respectively, upon portions of the frame.

The gluing mechanism is illustrated most clearly in Figures 25 to 29, inclusive. The gluing mechanism, of course, includes two glue applying devices, one to act upon each of the spaced major bottom flaps of the container, but it is only necessary to describe one since both are preferably exactly similar. Each glue applying means is supported upon a transversely extending bridging member 194 the ends of which are directly or indirectly supported upon the side frame members of the machine. Each device includes a glue roll 195 mounted upon a shaft 196 which projects to the side of the machine and is directly driven by an electric motor or the like. Glue applying roll 195 works between side plates 197 which tightly engage the end surfaces of the roller, the roller and the side plates, together with the inclined plate 198, hereinafter designated a spreader plate, defining a substantially V-shaped trough for the reception and storage of a small body of a suitable adhesive, as indicated at 199. As the roll 195 revolves in the direction of the arrow in Figure 25 it carries upon its surface, after passing under the spreader plate 198, a thin layer of adhesive and the thickness of this layer is controlled by the position of the lower edge of the spreader plate with respect to the cylindrical surface of the roll. The spreader plate is attached by means of a screw 200 to a block 201, slidable in a recess formed in the supporting bar 194, the block being retained in this recess by means of the pin 202 which projects through a cylindrical aperture formed in the rear of the block. A spring 203 normally urges the block upwardly into contact with a plate 204 mounted on bar 194 but the position of the block and the spreader plate may be adjusted downwardly by rotating the pin 202, the enlarged and threaded upper end of which passes through a threaded aperture in the upper plate 204. The lower shoulder of this threaded portion bears upon the upper surface of block 201 and, when the pin 202 is rotated in one direction the block and spreader plate will be adjusted downwardly against the action of the spring and, when rotated in the opposite direction, will be lifted by the spring. A cover plate 205 prevents contamination of the adhesive 199 by dirt falling from above.

The gluing means is so positioned on the bottom closing mechanism that each major flap, to the upper surface of which a coating of adhesive is to be applied, moves generally as indicated by the chain line in Figure 25, the upper surface of the flap being engaged by the glue covered surface of the glue rollers and the undersurface of the flap being supported by the pressure roll 206, the distance between the surfaces of the pressure and glue rollers being adjusted so as to be normally less than the thickness of the paper to pass between them. It will be perceived from an inspection of Figures 25 and 27 that the pressure roll 206 is mounted upon a shaft 207 which is pivotally hung by means of arms 208 from a supporting bracket 209 so that the pressure roll is adjustable along an arc centered on the axis of swing of arms 208. Normally, however, the pressure roll is resiliently held in the position in which it is shown in Figure 25 by a spring 210 one end of which bears against the swinging bracket 208 and the other end of which bears against an adjustable nut 211 upon the lower end of a stud 212 the upper end of which is attached to a stationary frame part. However, the swinging pressure roll support 208 is held in such spaced relationship to the glue roll as may be desired by means of an adjustable screw 213. Hence the relative position of the pressure roll with respect to the glue roll may be very definitely fixed without, however, making it impossible for the pressure roll to back away from the glue roll whenever a major bottom flap is passed between them. Predetermined pressure of the upper surface of each major bottom flap against the glue roll is thereby assured. As will be observed from an inspection of Figure 26, the side plates 197 are retained in position by spring pressed detents 214, so as to be readily removable, the springs 215 also acting to lightly urge the plates 197 against the ends of the glue roll 195, to maintain tight contact at all times.

It will be appreciated that the various component elements of the glue applying mechanism may be varied in design and arrangement in order to apply glue to container flaps of bottles of different sizes and types, and that the various elements of the squaring-out and bottom forming mechanisms may be likewise modified for the same reason. That embodiment of the invention which is described and illustrated is set forth by way of example only.

Having thus described the invention, what is claimed as new and desired to be secured by Letters Patent is:

1. In a container fabricating machine, in combination, a casing for a coating apparatus or the like having a side wall provided with an aperture through which a partially completed container may be introduced, means directly above the casing for holding a pack of collapsed tubular containers, and mechanism for withdrawing blanks singly from said pack, squaring the same, and passing them into said casing through said aperture.

2. In a container fabricating machine, in combination, means for receiving squared-out containers ready for coating and further processing, second means positioned directly above said first means for supporting a pack of collapsed tubular blanks, squaring out such blanks singly in succession and delivering them to end closing mechanism, and end closing mechanism located laterally of said first and second means for receiving squared-out blanks from said second means, closing one end thereof, and delivering the same to said first means.

3. The combination set forth in claim 2 in which said end closing mechanism includes a plurality of mandrels mounted for revolution about a horizontal axis together with means for angularly advancing the mandrel with a step-by-step movement, the mandrel mounting presenting each mandrel successively to the blank delivery mechanism while upwardly inclined from said horizontal axis, and thereafter advancing each mandrel successively to a downwardly inclined container discharge position.

4. Container end closing mechanism comprising a mandrel for interiorly supporting a tubular open-ended container with end closure flaps projecting beyond the end of the mandrel, and means cooperating with the mandrel for removing the moisture from certain of said end flaps as a preliminary to a flap gluing operation, said means including an element for pressing said flaps against the mandrel while applying heat thereto.

5. Container fabricating mechanism comprising means for squaring out a collapsed tubular blank and placing the same in a chute with end flaps projecting axially of the chute, a mandrel aligned with the chute, and means for sliding the container out of the chute onto the mandrel, said means including a pusher having a resiliently supported presser foot for engaging and deflecting inwardly one of said end flaps and moving the container toward the mandrel, and stop means positioned adjacent the mandrel end for limiting the movement of the presser foot toward the mandrel.

6. Container fabricating mechanism including a series of mandrels each adapted to receive and interiorly support a squared-out container, means for advancing the mandrels in succession past a container loading station, means for sliding a squared-out container onto each mandrel passing said station, and a device mounted adjacent the path of movement of the mandrels for frictionally engaging a container being loaded onto a mandrel at the loading station and holding the same against accidental sliding movement axially of the mandrel.

7. The combination set forth in claim 6 in which said device comprises a spring-pressed block having a container wall engaging surface normally spaced from the side surface of a mandrel a distance less than the thickness of the container wall.

8. A container fabricating mechanism comprising a series of container supporting mandrels mounted for intermittent movement along a fixed path, means for folding over the end of each mandrel the end flaps of a container supported thereon, and mechanism for acting upon such folded over end flaps when the mandrel is stationary, said mechanism including a flap engaging block and means for causing the block and mandrel to approach each other to act upon and compress the end flaps, said means including a resilient element through which the force for compression of the flaps is transmitted.

9. A container fabricating mechanism comprising a series of container supporting mandrels mounted for intermittent movement along a fixed path, means for folding over the end of each mandrel the end flaps of a container supported thereon, and mechanism for acting upon such folded over end flaps when the mandrel is stationary, said mechanism including a flap engaging block and means for moving the block axially of the mandrel the last mentioned means including a plunger, a member for reciprocating the plunger axially of the mandrel, and means including a spring connecting the plunger and block whereby the block may be moved toward the mandrel by force applied through the spring.

10. Container end closing mechanism comprising, in combination, a support for holding an unfinished container with an end closure flap so positioned that both faces thereof are accessible to heat and pressure applying elements, and mechanism for applying heat and pressure to said flap to eliminate its contained moisture prior to gluing, said mechanism including elements for engaging the oppositely facing surfaces of said flap, means for relatively moving said elements to cause them to clamp and subsequently release a container flap positioned between them, and a device for heating one of said elements so that the flap will be rapidly heated while so clamped.

CHARLES Z. MONROE.